United States Patent
Vaidya et al.

(10) Patent No.: US 11,420,153 B2
(45) Date of Patent: Aug. 23, 2022

(54) HYDROGEN SULFIDE-CARBON DIOXIDE MEMBRANE SEPARATION SYSTEMS AND PROCESSES

(71) Applicants: SAUDI ARABIAN OIL COMPANY, Dhahran (SA); Membrane Technology and Research, Inc., Newark, CA (US)

(72) Inventors: Milind M. Vaidya, Dhahran (SA); Sebastien A. Duval, Dhahran (SA); Feras Hamad, Dhahran (SA); Richard Baker, Newark, CA (US); Tim Merkel, Newark, CA (US); Kaaeid Lokhandwala, Newark, CA (US); Ahmad A. Bahamdan, Dammam (SA); Faisal D. Al-Otaibi, Dhahran (SA)

(73) Assignees: SAUDI ARABIAN OIL COMPANY; MEMBRANE TECHNOLOGY AND RESEARCH, INC., Newark, CA (US)

( * ) Notice: Subject to any disclaimer, the term of this patent is extended or adjusted under 35 U.S.C. 154(b) by 215 days.

(21) Appl. No.: 16/877,433

(22) Filed: May 18, 2020

(65) Prior Publication Data

US 2020/0360853 A1 Nov. 19, 2020

Related U.S. Application Data

(60) Provisional application No. 62/849,254, filed on May 17, 2019.

(51) Int. Cl.
*B01D 53/22* (2006.01)
*B01D 71/36* (2006.01)
(Continued)

(52) U.S. Cl.
CPC ......... *B01D 53/228* (2013.01); *B01D 53/226* (2013.01); *B01D 71/36* (2013.01);
(Continued)

(58) Field of Classification Search
CPC ............ C01B 17/0404; C01B 17/0408; C01B 17/508; C01B 17/167; C10L 3/102;
(Continued)

(56) References Cited

U.S. PATENT DOCUMENTS

| | | | |
|---|---|---|---|
| 3,896,215 | A | 7/1975 | Bratzler et al. |
| 4,001,386 | A | 1/1977 | Klein et al. |

(Continued)

FOREIGN PATENT DOCUMENTS

| | | |
|---|---|---|
| MX | 2013015303 A | 6/2015 |
| WO | 2011124326 A1 | 10/2011 |
| WO | 2017103547 A1 | 6/2017 |

OTHER PUBLICATIONS

Kniep et al., "Field tests of MTR membranes for syngas separations: final report of CO2-selective membrane field test activities at the national carbon capture center," Membrane Technology and Research, Inc., Dec. 15, 2017: pp. 1-27.

(Continued)

*Primary Examiner* — Timothy C Vanoy
(74) *Attorney, Agent, or Firm* — Bracewell LLP; Constance Gall Rhebergen

(57) ABSTRACT

A process for recovering sulfur from a sour gas is provided. The process includes the steps of: providing the sour gas to a membrane separation unit having a carbon dioxide-selective membrane that comprises a perfluoropolymer, wherein the sour gas comprises carbon dioxide and at least 1 mol % hydrogen sulfide; separating the sour gas using the carbon dioxide-selective membrane in the membrane separation stage to obtain hydrogen sulfide-enriched gas and hydrogen sulfide-stripped gas, wherein the hydrogen sulfide-enriched gas has a hydrogen sulfide concentration of at least 20 mol %, and wherein the hydrogen sulfide-stripped gas comprises (Continued)

carbon dioxide; and processing the hydrogen sulfide-enriched gas in a sulfur recovery unit to obtain sulfur.

19 Claims, 4 Drawing Sheets

(51) Int. Cl.

| | |
|---|---|
| *B01D 71/44* | (2006.01) |
| *C01B 17/16* | (2006.01) |
| *C01B 17/50* | (2006.01) |
| *C08F 14/26* | (2006.01) |
| *C08F 34/02* | (2006.01) |
| *C09K 8/58* | (2006.01) |

(52) U.S. Cl.
CPC ............ *B01D 71/44* (2013.01); *C01B 17/167* (2013.01); *C01B 17/508* (2013.01); *C08F 14/26* (2013.01); *C08F 34/02* (2013.01); *C09K 8/58* (2013.01)

(58) Field of Classification Search
CPC ......... C10L 3/103; C10L 3/104; B01D 53/22; B01D 53/225; B01D 53/226; B01D 53/526; B01D 53/62; B01D 61/00; B01D 61/58; B01D 63/00; B01D 65/00; B01D 71/32; B01D 2256/00; B01D 2256/22; B01D 2257/304; B01D 2257/504; B01D 2317/00; B01D 53/228; B01D 71/36; B01D 71/44; C08F 14/26; C08F 34/02; C09K 8/58

See application file for complete search history.

(56) References Cited

U.S. PATENT DOCUMENTS

| | | | |
|---|---|---|---|
| 4,507,275 | A | 3/1985 | Reed |
| 4,508,699 | A | 4/1985 | Schoofs |
| 5,304,361 | A | 4/1994 | Parisi |
| 5,407,466 | A | 4/1995 | Lokhandwala et al. |
| 5,558,698 | A | 9/1996 | Baker et al. |
| 5,749,941 | A | 5/1998 | Jansen et al. |
| 6,387,159 | B1 | 5/2002 | Butwell et al. |
| 6,508,863 | B1 | 1/2003 | Byrne et al. |
| 6,565,626 | B1 | 5/2003 | Baker et al. |
| 6,998,098 | B2 | 2/2006 | Allison |
| 7,459,011 | B2 | 12/2008 | Cadours et al. |
| 9,593,015 | B2 | 3/2017 | Ballaguet et al. |
| 9,981,848 | B2 | 5/2018 | Ballaguet et al. |
| 2005/0135992 | A1 | 6/2005 | Chow |
| 2010/0310439 | A1 | 12/2010 | Brok et al. |
| 2012/0085973 | A1 | 4/2012 | Jungst et al. |
| 2014/0138317 | A1* | 5/2014 | Liu ............... B01D 53/228 95/55 |
| 2015/0298972 | A1* | 10/2015 | Ballaguet ......... B01D 53/047 423/575 |
| 2016/0206993 | A1 | 7/2016 | Deng |
| 2017/0137288 | A1* | 5/2017 | Ballaguet ......... B01D 53/226 |
| 2020/0197859 | A1* | 6/2020 | Karode ............. B01D 69/08 |

OTHER PUBLICATIONS

Ramasubramanian, "CO2(H2O)-selective membranes for fuel cell hydrogen purification and flue gas carbon capture: an experimental and process modeling study," The Ohio State University, Dissertaion, Dec. 31, 2013 pp. 1-270.

Vakharia, "Development of membrane technology for CO2 removal and H2 purificaton: a techno-economic, lab-scale, and pilot-scale study," The Ohio State University, Dissertation, Dec. 31, 2016: pp. 1-198.

Wang et al., "Selective removal of trace H2S from gas streams containing CO2 using hollow fibre membrane modules/contractors," Separation and Purification Technology, vol. 35(2), Feb. 15, 2004: pp. 1-7.

Sanders et al., "Energy-efficient polymeric gas separation membranes for a sustainable future: A review," Polymer, vol. 54(18), Jul. 4, 2013: pp. 4729-4761.

Yi et al., "Ultraselective glassy polymer membranes with unprecedented performance for energy-efficient sour gas separation," Sci. Adv., vol. 5(5), May 1, 2019: pp. 1-11.

Arcella et al., "A study on a perfluoropolymer purification and its application to membrane formation," Journal of Membrane Science, vol. 163(2), Nov. 1, 1999: pp. 203-209.

Mojtaba et al., "Selective removal of H2S from gas streams with high CO2 concentration using hollow-fiber membrane contractors," Chem. Eng. Technol., vol. 42(1), Nov. 14, 2018: pp. 196-208.

International Search Report and Written Opinion of PCT Application No. PCT/US2020/033326 dated Sep. 21, 2020: pp. 1-27.

Fang, M., et al., "High-performance perfluorodioxolane copolymer membranes for gas separation with tailored selectivity enhancement" Mater. Chem. A, 2018, 6, pp. 652-658.

Koike, K. et al.; Synthesis and characterization of copolymers of perfluoro(2-methylene-4,5-dimethyl-1,3-dioxolane) and perfluoro(2-methylene-1,3-dioxolane), Journal of Fluorine Chemistry, 156, 2013; pp. 198-202.

Liu, W. et al.; "Synthesis and radical polymerization of perfluoro-2-methylene-1,3-dioxolanes," Macromolecules, 38 (2005) 9466-9473.

Merkel, T.C, et al. "Comparison of Hydrogen Sulfide Transport Properties in Fluorinated and Nonfluorinated Polymers," 2006, 39, 7591-7600.

Mikes, F. et al.; "Characterization and properties of semicrystalline and amorphous perfluoropolymer: poly(per-fluoro-2-methylene-1,3-dioxolane)," Polym Adv.Technol. 22 (2011), pp. 1272-1277.

Orme, C. et al.; "Mixed gas hydrogen sulfide permeability and separation using supported Polyphosphazines membranes", Journal of Membrane Science, 253, 2005, pp. 243-249.

Perry, D. et al., "Better acid gas enrichment" Flexsorb solvents ExxonMobil Research and Engineering Company, Flexsorb Solvents, Sulphur 326; Jan.-Feb. 2010; pp. 38-42.

Turk et al., "Novel Technologies for Gaseous Contaminants Control", U.S. Department of Energy National Energy Technology Laboratory, 2001, pp. 123.

Okamoto et al., "Synthesis and properties of amorphous perfluorinated polymers," Chem.Today, 27 (2009) pp. 46-48.

\* cited by examiner

A  B  C  D

E  F  G  H

HYDROGEN SULFIDE-CARBON DIOXIDE MEMBRANE SEPARATION SYSTEMS AND PROCESSES

INCORPORATION BY REFERENCE

This application claims priority from U.S. Provisional Application No. 62/849,254, filed on May 17, 2019. This application incorporates by reference the contents of the provisional application, along with any other documents mentioned in the specification. Such application and documents are each incorporated in their entirety.

TECHNICAL FIELD

This disclosure generally relates to membrane separation processes and systems for enriching hydrogen sulfide in sour gas streams for processing in a sulfur recovery complex.

BACKGROUND OF THE ART

Hydrogen sulfide is a reactive and poisonous contaminant that is sometimes found in industrial processes and process streams involving hydrocarbons. Hydrogen sulfide in industrial process streams can be converted to elemental sulfur in a sulfur recovery complex, which may include processing hydrogen sulfide-rich gas in a Claus unit. In a Claus unit, hydrogen sulfide is first partially oxidized to produce sulfur dioxide and then reacted in the presence of a catalyst to produce elemental sulfur and water vapor. By maintaining a sufficiently high temperature in the oxidation stage of the Claus unit, other contaminants present in the hydrogen sulfide-rich gas (e.g., mercaptans, carbonyl sulfide, carbon disulfide, benzene, toluene, and xylene) can be eliminated.

When hydrogen sulfide concentrations are sufficiently high, the energy released in the oxidation of hydrogen sulfide is sufficient to carry out the partial oxidation of hydrogen sulfide and to eliminate other contaminants. But additional energy must be provided when hydrogen sulfide concentrations are too low. Naturally, the presence of other compounds (e.g., carbon dioxide) in the sour gas can reduce the concentration of hydrogen sulfide in the sour gas. Amine absorption processes are used conventionally to remove carbon dioxide and enrich hydrogen sulfide in a sour gas before introducing it to the sulfur recovery complex. However, conventional amine absorption processes are costly and limited in their ability to produce enriched hydrogen sulfide.

There is a need for more cost-effective hydrogen sulfide enriching processes capable of reliably producing higher concentrations of hydrogen sulfide.

SUMMARY

A general object of this disclosure is to provide systems and processes for enriching hydrogen sulfide in a sour gas for processing in a sulfur recovery complex. The systems and processes disclosed here involve removing carbon dioxide from a sour gas using a membrane separation unit to enrich hydrogen sulfide in the sour gas, and delivering hydrogen sulfide-enriched gas to a sulfur recovery complex for the production of sulfur.

A process for recovering sulfur form a sour gas is provided. The process includes the steps of: providing the sour gas to a membrane separation unit having a carbon dioxide-selective membrane that comprises a perfluoropolymer, wherein the sour gas includes carbon dioxide and at least 1 mol % hydrogen sulfide; separating the sour gas using the carbon dioxide-selective membrane in the membrane separation stage to obtain hydrogen sulfide-enriched gas and hydrogen sulfide-stripped gas, wherein the hydrogen sulfide-enriched gas has a hydrogen sulfide concentration of at least 20 mol %, and wherein the hydrogen sulfide-stripped gas includes carbon dioxide; and processing the hydrogen sulfide-enriched gas in a sulfur recovery unit to obtain sulfur.

According to at least one embodiment, the hydrogen sulfide-stripped gas also contains residual hydrogen sulfide, and the process also includes the steps of: oxidizing the hydrogen sulfide-stripped gas in an oxidizer such that the residual hydrogen sulfide in the hydrogen sulfide-stripped gas is reacted with oxygen to produce sulfur dioxide-bearing gas. The sulfur dioxide-bearing gas can be vented to the atmosphere, or captured for use in enhanced oil recovery operations.

According to at least one embodiment, the sulfur dioxide-bearing gas can have a concentration of hydrogen sulfide that is less than 0.1 mol %, alternately less than 0.015 mol %, alternately less than 0.01 mol %. The hydrogen sulfide enriched gas can have a concentration of hydrogen sulfide that is greater than 80 mol %, alternately greater than 90 mol %, alternately greater than 95 mol %.

According to at least one embodiment, the carbon dioxide-selective membrane can have carbon dioxide-hydrogen sulfide selectivity greater than 10, alternately greater than 20, alternately greater than 30.

According to at least one embodiment, the membrane separation unit can have a single-pass membrane stage configuration. According to at least one embodiment, the membrane separation unit can have a two-stage retentate-in-series membrane configuration. According to at least one embodiment, the membrane separation unit can have a two-stage permeate-in-series membrane configuration. According to at least one embodiment, the membrane separation unit can have a three-stage membrane configuration.

According to at least one embodiment, the perfluoropolymer can include a monomer having the following chemical structure:

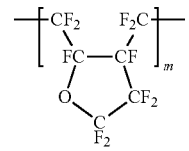

According to at least one embodiment, the perfluoropolymer can include a monomer having the following chemical structure:

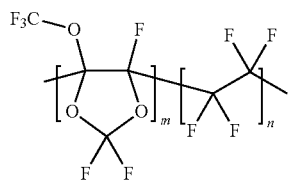

According to at least one embodiment, the perfluoropolymer can include a monomer having a chemical structure selected from the group consisting of:

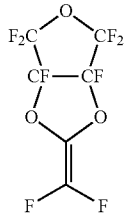

A

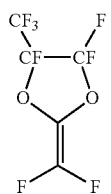

B

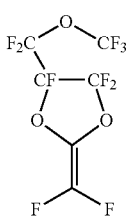

C

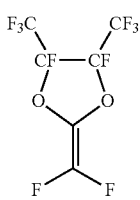

D

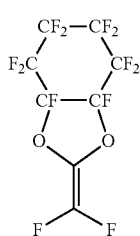

E

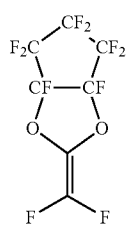

F

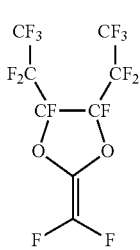

G

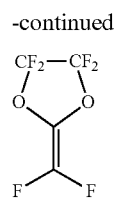

H

BRIEF DESCRIPTION OF THE DRAWINGS

The embodiments disclosed here will be understood by the following detailed description along with the accompanying drawing. The embodiment in the figure is given as an example; the disclosure is not limited to the content of the illustration.

FIG. 4a is a process diagram of a single-pass membrane separation process; FIG. 4b is a process diagram of a two-stage retentate-in-series membrane separation process; FIG. 4c is a process diagram of a two-stage permeate-in-series membrane separation process; FIG. 4d is a process diagram of a three-stage membrane separation process.

DETAILED DESCRIPTION

Figure 1:
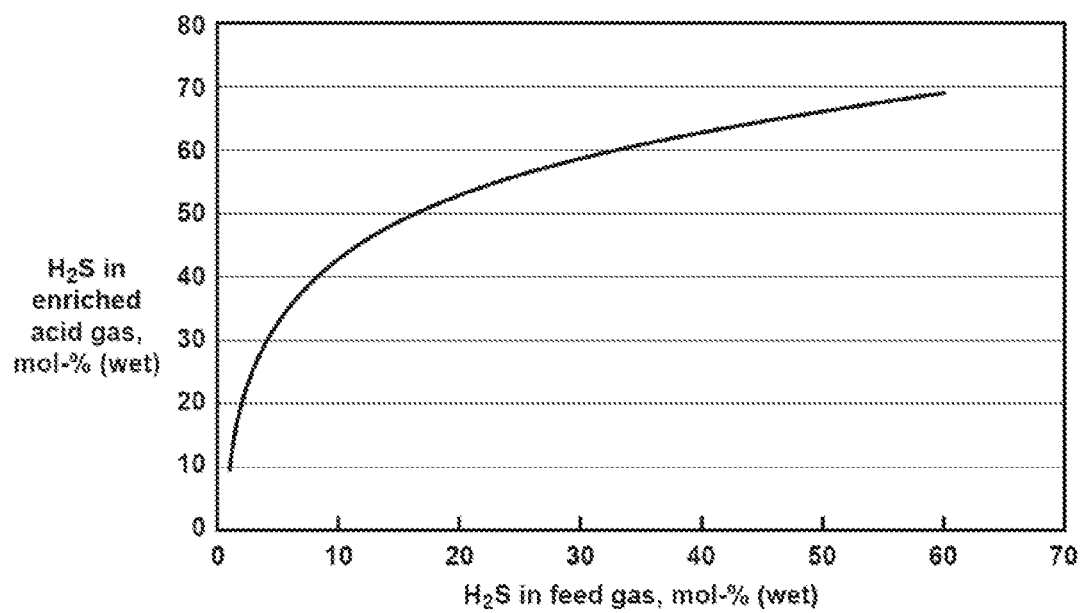
FIG. 1 is a plot showing hydrogen sulfide-carbon dioxide separation using a selective amine absorption process.

This disclosure describes various embodiments related to systems and methods for enriching hydrogen sulfide in a sour gas for feed to a sulfur recovery unit. For certain embodiments, many details are provided for thorough understanding of the various components or steps. In other instances, well-known processes, devices, compositions, and systems are not described in particular detail so that the embodiments are not obscured by detail. Likewise, illustrations of the various embodiments can omit certain features or details so that various embodiments are not obscured.

The drawings provide illustrations of various embodiments. Other embodiments can be used, and logical changes can be made without departing from the scope of this disclosure. The following detailed description and the embodiments it describes are not to be considered limiting. Many other undisclosed changes and modifications to the embodiments disclosed in this disclosure can fall within its scope. The patentable scope is defined by the claims, and can include other examples that occur to those skilled in the art. The scope of the claims includes other examples that may have equivalent elements to those described in the claims.

As used in this disclosure, the term "hydrogen sulfide" is used synonymously with the terms "dihydrogen sulfide" and "dihydrogen monosulfide" and has the chemical formula $H_2S$.

As used in this disclosure, the term "carbon dioxide" has the chemical formula $CO_2$.

Sour gas streams intended for sulfur recovery sometimes contain a lower concentration of hydrogen sulfide than is suitable for processing in a sulfur recovery unit. And even in instances where the sour gas contains a suitable concentration of hydrogen sulfide for processing in a sulfur recovery unit, it may be desirable to enrich the gas in hydrogen sulfide further to improve the performance of the sulfur recovery unit. Typically, the sulfur recovery process is carried out using a Claus plant. Gases fed to the Claus plant must contain at least 20 mol % hydrogen sulfide. Preferably the feed gas contains at least 50 mol % hydrogen sulfide, more preferably at least 80 mol %, most preferably at least 90 mol %. A higher concentration of hydrogen sulfide in gases fed to a Claus plant generally results in a higher temperature in the Claus plant furnace; which in turn results in less supplemental fuel being used and the destruction of contaminants such as aromatics, ammonia ($NH_3$), carbon monoxide (CO), carbonyl sulfide (COS), carbon disulfide ($CS_2$), and thiols (R—SH).

An example of a sour gas can be hydrogen sulfide-containing natural gas or a hydrogen sulfide-containing gas obtained from natural gas. Much of the world's natural gas supply contains more than 2 mol % carbon dioxide and more than 4 ppm hydrogen sulfide. Before natural gas containing such concentrations of carbon dioxide and hydrogen sulfide can be used or delivered to a pipeline, it is usually treated to bring concentrations of carbon dioxide and hydrogen sulfide down to suitable levels. The carbon dioxide and hydrogen sulfide removed from the natural gas can be used in a sulfur recovery process as described in this disclosure.

Another example of a sour gas is a hydrogen sulfide-containing gas produced in the treatment of sulfur-containing oil in a refinery process. Oil products usually must be treated to reduce sulfur content to very low concentrations. Sulfur-containing oil is often treated by reacting the sulfur in the oil with hydrogen to obtain hydrogen sulfide along with some light hydrocarbons. These gases are usually treated using nonselective amine absorption to obtain a concentrated hydrogen sulfide stream. For some processes, the sour gas obtained is suitable for processing in a sulfur recovery unit without further enrichment. However, some processes produce a sour gas stream that contains a substantial amount of carbon dioxide and a relatively dilute concentration of hydrogen sulfide. For example, a refinery process can produce a sour gas stream that contains between about 1 and 50 mol % hydrogen sulfide, alternately between about 1 and 10 mol %, alternately between about 10 and 40 mol %, alternately between about 5 and 15 mol %. It is desirable to enrich hydrogen sulfide in such streams before they are sent to a sulfur recovery unit.

Other sources of sour gas can include syngas from the gasification of coal, biomass, or municipal waste. Such streams can contain a variety of concentrations of hydrogen sulfide. By way of example, syngas produced by the gasification of coal usually contains a mixture of carbon monoxide, hydrogen, and carbon dioxide, and can contain between about 0.3-3 mol % hydrogen sulfide. Typically, this stream must be treated to reduce the concentration of carbon dioxide and hydrogen sulfide before it can be used to make chemicals.

Amine absorption processes are commonly used to concentrate hydrogen sulfide in gases fed to sulfur recovery units. Such processes require large absorption and stripping columns, and can be costly to operate. Moreover, such processes have a limited capacity for achieving high concentrations of hydrogen sulfide. The processes and systems described in this disclosure can be used to reduce the size of, or eliminate completely, an amine absorption unit for concentrating hydrogen sulfide in gases fed to a sulfur recovery unit.

This disclosure discusses nonselective absorption processes and selective absorption processes. Nonselective absorption processes are typically used to separate hydrogen sulfide and carbon dioxide from a feed stream such as syngas to produce a product stream suitable for use downstream. Selective absorption processes are configured to preferentially remove most or all of a particular acid gas component (such as hydrogen sulfide), and may remove only a portion of another acid gas component (such as carbon dioxide).

A liquid solvent for selectively removing acid gas components (e.g., hydrogen sulfide, carbon dioxide, carbonyl sulfide, etc.) from syngas can be used in an absorption process to remove hydrogen sulfide, carbon dioxide, and other contaminants. The efficiency of the process will be determined by certain absorption characteristics of the solvent. Absorption can be a simple physical solution of the gases or it can involve a reversible chemical reaction between the specific gases and some components of the solvent mixture.

Suitable physical solvents for carbon dioxide separation include methanol at temperatures between −20 and −30° C. (the Rectisol® process), dimethyl ethers of polyethylene glycol, DMPEG (the Selexol® process), and n-methyl-2-pyrrolidone (NMP; the Purisol® process). Suitable chemical solvents include aqueous amine solutions of mono- and diethanolamine (MEA; DEA), methyl diethanolamine (MDEA), and diisopropanolamine (DIPA). Methyl diethanolamine is the most commonly used chemical solvent.

Chemical absorption is suitable for removing carbon dioxide from a carbon dioxide-containing gas if the concentration of carbon dioxide in the gas is relatively low (i.e., less than about 15 mol %) and at moderate pressure (i.e., between about 10-30 bar). However, physical absorption may be preferred if the carbon dioxide-containing gas has a concentration of carbon dioxide that is greater than about 15 mol % or pressure that is greater than about 30 bar. For example, physical absorption processes such as Rectisol®, Selexol®, or Purisol® may be preferable for a gas with a concentration of carbon dioxide greater than about 20 mol % or a pressure greater than about 40 bar.

Some nonselective amine absorption processes can use MEA to remove carbon dioxide and hydrogen sulfide to produce a product gas containing between about 1 and 2 mol % carbon dioxide and less than about 1 ppm hydrogen sulfide. The acid gases removed are typically collected in a stream with a concentration of hydrogen sulfide that varies widely. In some instances, the concentration of hydrogen sulfide in the stream is sufficiently high to be sent directly to a sulfur recovery unit. However, it is common for the stream to be treated to enrich hydrogen sulfide for the sulfur recovery process.

An example of a selective amine absorption process involves using MDEA to selectively separate hydrogen sulfide from a stream containing both hydrogen sulfide and carbon dioxide. FIG. 1 shows a plot of hydrogen sulfide concentration in a recovered hydrogen sulfide-enriched gas from a selective amine absorption process as a function of concentration of hydrogen sulfide in the feed gas to the process. In such a process, the MDEA selectively absorbs nearly all of the hydrogen sulfide in the feed gas along with a portion of the carbon dioxide in the feed gas. Because a portion of the carbon dioxide is also absorbed, the process results in only partial enrichment of hydrogen sulfide. The concentration of hydrogen sulfide in the stripped feed gas will typically be less than 20-50 ppm, or less than between 50-100 ppm. In some instances, the stripped feed stream can be catalytically or thermally oxidized and then safely released to the atmosphere without additional treatment. As shown in FIG. 1, the amine absorption process is most effective at treating a feed gas having a relatively low concentration (i.e., less than about 20 mol %) of hydrogen sulfide. For streams having a greater concentration of hydrogen sulfide, the effectiveness of the process is rather marginal.

In industrial processes, gas streams containing hydrogen sulfide can be treated in a membrane separation unit to obtain hydrogen sulfide-rich gas for feed to a sulfur recovery complex. The membrane separation unit can have a membrane separation stage that includes a carbon dioxide-selective membrane, where carbon dioxide is the fast (i.e., more permeable) gas. A desirable gas membrane has high selectivity (i.e., separating power) and high permeability to the fast gas. Factors affecting carbon dioxide-hydrogen sulfide selectivity are described in a paper by TC Merkel and LG Toy, "Comparison of hydrogen sulfide transport properties in fluorinated and nonfluorinated polymers," Macromolecules, 2006, 39(22), 7591-7600. Some of the data available in that paper is reproduced in FIG. 2, which shows membrane permeability and selectivity for carbon dioxide for various membrane materials. In some embodiments, the carbon dioxide-selective membrane comprises perfluorinated polymer compounds, which can have minimum carbon dioxide-hydrogen sulfide selectivity in the range of about 5-30. According to at least one embodiment, the carbon dioxide-selective membrane has selectivity of at least about 5, alternately at least about 10, alternately at least about 20, alternately at least about 30.

Because perfluoropolymers are relatively insoluble, it is difficult to produce thin membranes using conventional solution casting and coating methods. Only three amorphous solvent-processable glassy perfluoropolymers are commercially available presently, which are identified using the trade names Teflon® AF (DuPont™), Cytop® (Asahi Glass™), and Hyflon® AD (Solvay™). These perfluoropolymers can be described as either copolymers of perfluorodioxole rings and tetrafluoroethylene (Teflon® AF and Hyflon® AD) or a cyclic perfluoro homopolymers (Cytop®). The dioxole rings of these polymers generally hinder polymer chain packing, resulting in amorphous polymers with relatively high gas permeability. When tetrafluoroethylene is used with the copolymers to improve processability, the gas permeability is also lowered and size selectivity is increased in Teflon® AF and Hyflon® AD. There is a difference of two orders of magnitude between the most nitrogen-permeable polymer (Teflon® AF2400) and the least nitrogen-permeable polymer (Cytop®) (Table 1). These perfluoropolymers are much more permeable than conventional glassy polymers used for membrane gas separations, but they also have reduced size selectivity.

TABLE 1

Properties of commercially available amorphous glassy perfluoropolymers suitable for solvent processing

| Polymer | Chemical structure | Glass transition temperature (° C.) | Nitrogen permeability (barrer)$^a$ | $O_2/N_2$ selectivity |
|---|---|---|---|---|
| Teflon® AF2400 | (structure) | 240 | 480 | 2.0 |
| Hyflon® AD60 | (structure) | 134 | 24 | 2.9 |
| Cytop® | (structure) | 108 | 5.0 | 3.3 |

$^a$Barrer = 3.348 × 10$^{-19}$ kmol/m · s · Pa

Figure 2:
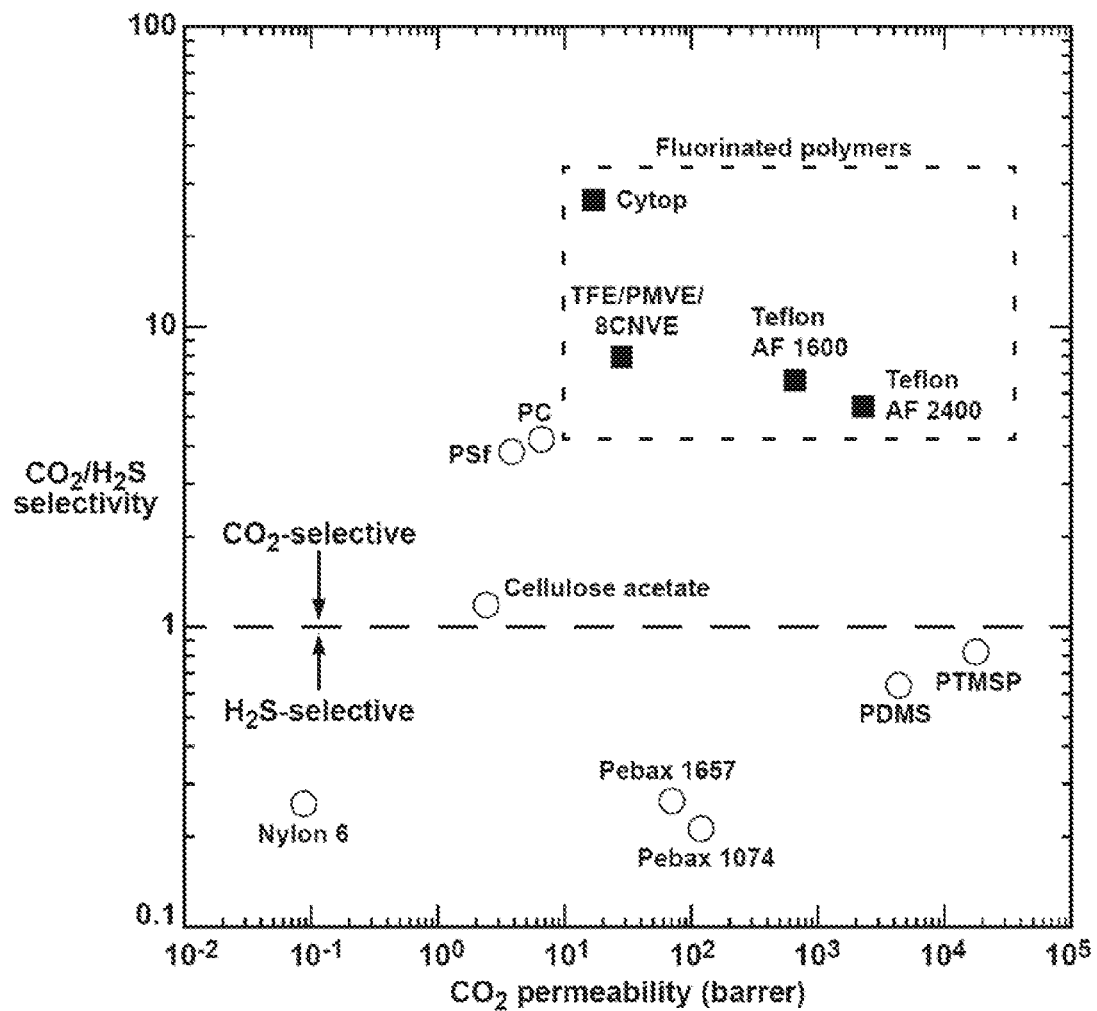
FIG. 2 is a plot showing carbon dioxide-hydrogen sulfide selectivity for various membranes as a function of carbon dioxide permeability.

A new class of amorphous perfluoropolymers has been developed by Membrane Technology and Research, Inc. using the perfluoro monomers shown in FIG. 2. Two of these monomers are particularly useful: perfluoro-2-methylene-4,5-dimethyl-1,3-dioxolane (Monomer D), and perfluoro-2-methylene-1,3-dioxolane (Monomer H). Characterization and synthesis of these perfluoropolymers have been described by Okamoto et al., "Synthesis and properties of amorphous perfluorinated polymers," Chimica oggi/Chem. Today, 27(4), pp. 46-48; Koike et al., "Synthesis and radical polymerization of perfluoro-2-methylene-1,3-dioxolanes," Macromolecules, 38, no. 23 (2005), pp. 9466-9473; Koike et al., "Synthesis and characterization of copolymers of perfluoro(2-methylene-4,5-dimethyl-1,3-dioxolane) and perfluoro(2-methylene-1,3-dioxolane)," J. Fluor. Chem., 156

(2013), pp. 198-202; Mikeš et al., "Characterization and properties of semi crystalline and amorphous perfluoropolymers: poly(per-fluoro-2-methylene-1,3-dioxolane)," Polym. Adv. Tech., 22 (2011), pp. 1272-1277.

Figure 3:
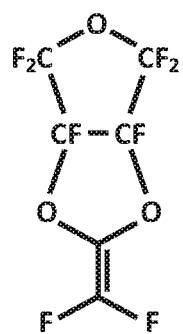
FIG. 3 shows structural formulas for some perfluoropolymer monomers useful for making homopolymers and copolymers, which are particularly useful in the membranes of some embodiments.
Figure 3:
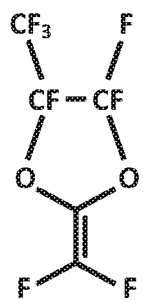
Figure 3:
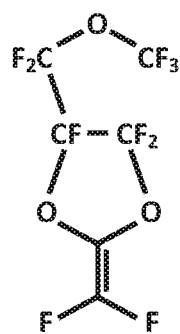
Figure 3:
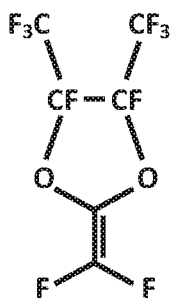
Figure 3:
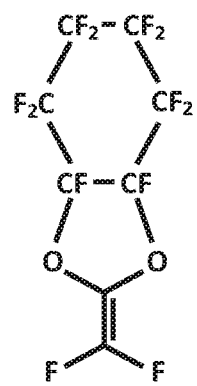
Figure 3:
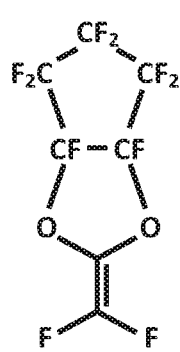
Figure 3:
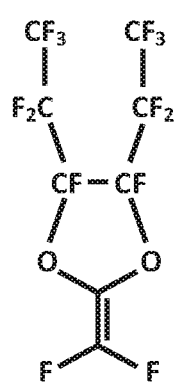
Figure 3:
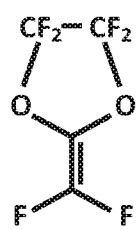

The monomers and chemical structures shown in FIG. 3 are preferred for use in the carbon dioxide-hydrogen sulfide selective membranes of this disclosure. Of these, homopolymers and copolymers made from Monomer B, Monomer D, and Monomer H are particularly preferred. Copolymerization of these monomers can be carried out in bulk and in hexafluorobenzene solution using perfluoro dibenzoyl peroxide. Because monomer reactivity ratios are nearly equal, resulting copolymers form an ideal random structure. For example, if the composition of Monomer D is greater than about 30 mol % the resulting copolymers are completely amorphous and soluble in fluorinated solvents. Typical glass transition temperature (Tg) results are shown in Table 2.

TABLE 2

Glass transition temperature ($T_g$) resulting from various copolymer compositions of Monomer D and Monomer H

| Polymer | Monomer D composition (mol %) | Monomer H composition (mol %) | $T_g$ (° C.) |
|---|---|---|---|
| Monomer D | 100 | 0 | 165 |
| Copolymer 1 | 74 | 26 | 155 |
| Copolymer 2 | 58 | 42 | 145 |
| Copolymer 3 | 43 | 57 | 125 |
| Copolymer 4 | 20 | 80 | 106 |
| Monomer H | 0 | 100 | 228[a] |

[a]Melting temperature ($T_m$).

Copolymers of Monomer D and Monomer H can achieve combinations of selectivity and permeance that are unattainable using commercially available perfluoropolymer materials (Table 3 and Table 4). For instance, Copolymer 3 achieves much greater hydrogen-methane selectivity than Cytop® and Hyflon® AD60, while its hydrogen permeance is greater than that of Cytop® and less than that of Hyflon® AD60. This suggests that Copolymer 3 is more size-sieving than the most selective of the commercial perfluoropolymers, Cytop®, and can be used in a membrane with relatively high permeance. All of the polymers shown in Table 3 and Table 4 have carbon dioxide-hydrogen sulfide selectivities of more than 10. The polymers shown in Table 4 achieved wet mixed gas selectivities above 10.

TABLE 3

Pure gas permeance and selectivities for commercial perfluoropolymers and copolymers of Monomers D and H

| | Permeance (gpu) | | | | Selectivity for gases paired with $CH_4$ | | | |
|---|---|---|---|---|---|---|---|---|
| Polymer | $N_2$ | $H_2$ | He | $CO_2$ | $N_2$ | $H_2$ | He | $CO_2$ |
| Teflon® AF 2400 | 2,700 | 10,500 | 10,500 | 13,000 | 1.2 | 4.6 | 4.6 | 5.7 |
| Hyflon® AD60 | 180 | 1,700 | 2,600 | 1,300 | 2.4 | 23 | 35 | 18 |
| Cytop® | 18 | 290 | 790 | 150 | 3.0 | 48 | 130 | 25 |
| Copolymer 1 | 54 | 820 | 1,400 | 390 | 3.2 | 48 | 82 | 23 |
| Copolymer 2 | 41 | 700 | 1,250 | 330 | 4.2 | 72 | 130 | 34 |
| Copolymer 3 | 29 | 700 | 1,400 | 260 | 5.3 | 130 | 260 | 47 |

TABLE 4

Pure and mixed gas permeance and selectivities for membranes having commercial perfluoropolymers and copolymers of Monomers B and H

| | Pure gas[a] | | | Mixed gas[b] | | |
|---|---|---|---|---|---|---|
| | Permeance (gpu) | | Selectivity | Permeance (gpu) | | Selectivity |
| Membrane | $N_2$ | $CO_2$ | $CO_2/N_2$ | $H_2S$ | $CO_2$ | $CO_2/H_2S$ |
| Hyflon® AD40 | 26 | 160 | 6.2 | 12.2 | 170 | 14 |
| Hyflon® AD60 | 79 | 500 | 6.4 | 38 | 490 | 13 |
| Copolymers of Monomers B and H | 37 | 280 | 7.7 | 5.3 | 170 | 32 |

[a]Pure feed gas at 50 psig feed pressure and 30° C.
[b]Mixed feed gas containing 33 mol % hydrogen sulfide in carbon dioxide at 50 psig and 30° C. (saturated with $H_2O$).

Membranes having the perfluoropolymers described in this specification can be designed to be used in membrane modules using conventional techniques. A few examples of suitable membrane module designs include spiral-wound modules, hollow fiber modules that use small polymeric capillaries or fibers that have the geometry of a shell and tube heat exchanger, and plate-and-frame modules. The membrane modules can also be configured to use a sweep gas on the permeate side of the membrane to improve separation. Multiple membrane modules can be manifolded together in a membrane separation unit to achieve a desired membrane area. According to at least one embodiment, the membrane modules and membrane stages can be in the absence of a hydrocarbon-selective membrane (e.g., a silicone rubber polydimethylsiloxane-type rubbery polymer or its equivalent); and the processes described in this disclosure can be carried out without using a hydrocarbon-selective membrane. According to at least one embodiment, the membrane modules and membrane stages can be in the absence of a hydrogen sulfide-selective membrane; and the processes described in this disclosure can be carried out without using a hydrogen sulfide-selective membrane.

In some embodiments, the membrane can have a carbon dioxide/hydrogen sulfide selectivity of at least 10 and a carbon dioxide permeance of at least 500 gpu. In some instances, membranes having carbon dioxide/hydrogen sulfide selectivity of 20 are used. In some instances, membranes having carbon dioxide/hydrogen sulfide selectivity of 30 are used. In some instances, the membrane can have carbon dioxide/hydrogen sulfide selectivity between about 10 and 30, preferably between about 20 and 30. According to at least one embodiment, the membrane can have carbon dioxide/hydrogen sulfide selectivity of at least 30.

Figure 4:
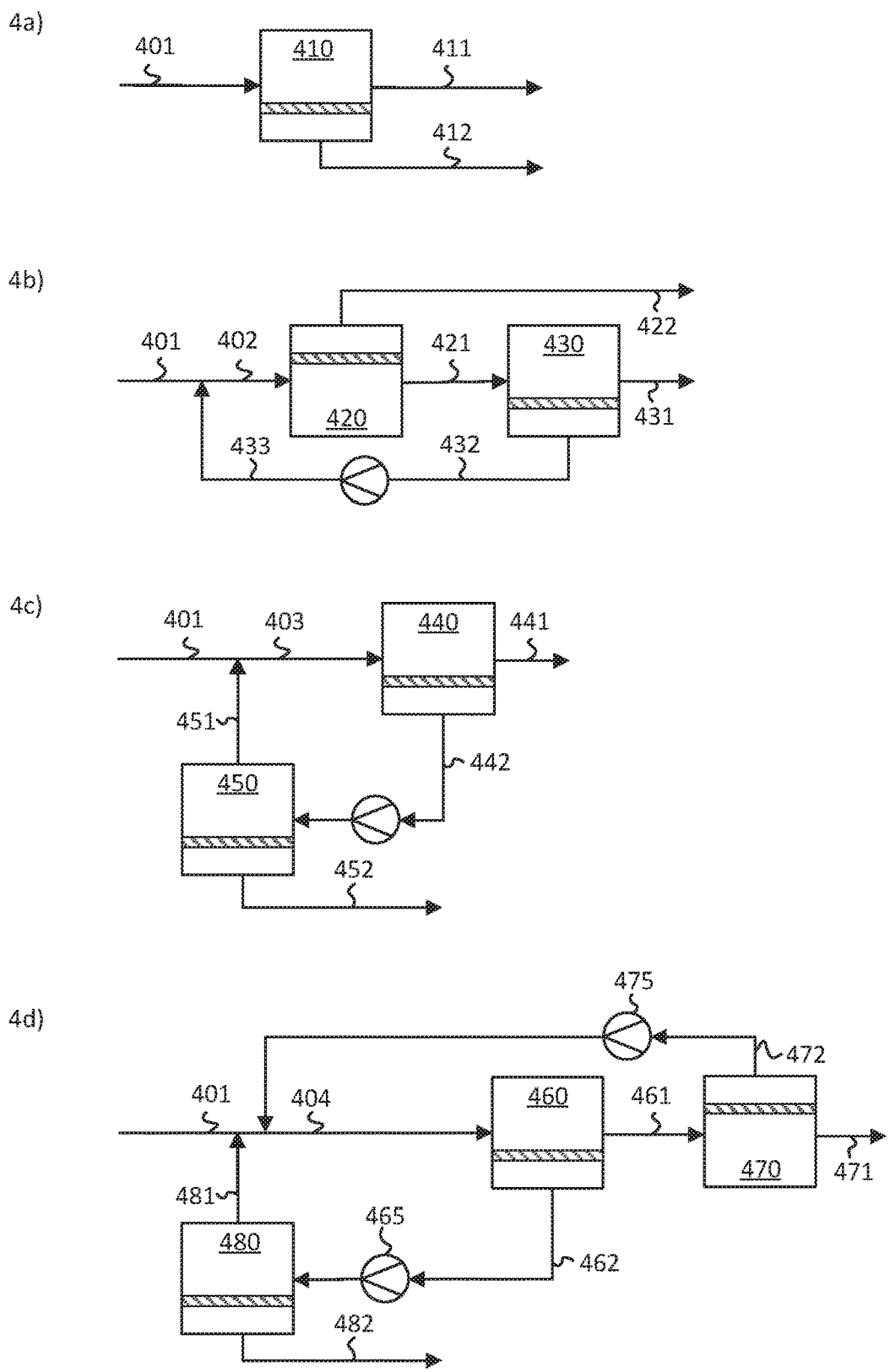
FIG. 4 is an illustration of various process diagrams of membrane separation processes for separating carbon dioxide and hydrogen sulfide.

A membrane stage can include one or multiple membrane modules in various configurations. Various membrane stage configurations are shown in FIG. 4: a single-pass membrane configuration in FIG. 4a; a two-stage configuration with retentate in series in FIG. 4b; a two-stage configuration with permeate in series in FIG. 4c; and a three-stage configuration in FIG. 4d. Each of the membrane stage configurations shown in FIG. 4 can be considered a membrane separation unit. These membrane separation units are capable of enriching hydrogen sulfide to at concentrations of 20-90 mol %. The minimum concentration of hydrogen sulfide that is suitable for processing in a Claus plant is about 20 mol %. A concentration of at least about 50 mol % is more desirable, and a concentration greater than about 90 mol % results in significant capital and operating cost savings.

FIG. 4a is the simplest configuration with a single membrane stage. In FIG. 4a, feed-gas stream 401 is fed to single-pass membrane stage 410 where it is introduced to a carbon dioxide-selective membrane to obtain single-pass retentate stream 411 and single-pass permeate stream 412; the single-pass retentate stream 411 and the single-pass permeate stream 412 being enriched in hydrogen sulfide and carbon dioxide respectively.

FIG. 4b involves two membrane stages with retentate from the first stage being fed to the next stage. In FIG. 4b, feed-gas stream 401 can be combined with compressed second-stage permeate stream 433 to obtain mixed feed-gas stream 402. Mixed feed-gas stream 402 is fed to first retentate-in-series membrane stage 420 where it is separated using a carbon dioxide-selective membrane to obtain first retentate-in-series retentate stream 421 and first retentate-in-series permeate stream 422; the first retentate-in-series retentate stream 421 and the first retentate-in-series permeate stream 422 being enriched in hydrogen sulfide and carbon dioxide respectively. The first retentate-in-series retentate stream 421 is then introduced to second retentate-in-series membrane stage 430, where it is separated using a carbon dioxide-selective membrane to obtain second retentate-in-series retentate stream 431 and second retentate-in-series permeate stream 432; the second retentate-in-series retentate stream 431 and the second retentate-in-series permeate stream 432 being enriched in hydrogen sulfide and carbon dioxide respectively. The second retentate-in-series permeate stream 432 is compressed and combined with feed-gas stream 401 to be recycled through the process.

FIG. 4c involves two membrane stages with permeate from the first stage being fed to the next stage. In FIG. 4c, feed-gas stream 401 is combined with second permeate-in-series retentate stream 451 from second permeate-in-series membrane stage 450 to obtain first-stage feed-gas stream 403. The first-stage feed-gas stream 403 is introduced to first permeate-in-series membrane stage 440 where it is separated using a carbon dioxide-selective membrane to obtain first permeate-in-series retentate stream 441 and first permeate-in-series permeate stream 442; the first permeate-in-series retentate stream 441 and the first permeate-in-series permeate stream 442 being enriched in hydrogen sulfide and carbon dioxide respectively. First permeate-in-series permeate stream 442 is compressed and then introduced to second permeate-in-series membrane stage 450 where it is separated using a carbon dioxide-selective membrane to obtain second permeate-in-series retentate stream 451 and second permeate-in-series permeate stream 452; the second permeate-in-series retentate stream 451 and the second permeate-in-series permeate stream 452 being enriched in hydrogen sulfide and carbon dioxide respectively. The second permeate-in-series retentate stream 451 is then combined with feed-gas stream 401.

FIG. 4d is an illustration of a system and process that combines elements of the systems and processes shown in FIGS. 4b and 4c. It includes three membrane stages and three steps, with retentate and permeate from the first stage being processed separately in the other two stages. In FIG. 4d, feed-gas stream 401 is combined with second membrane-stage permeate stream 472 and third membrane-stage retentate stream 481 from second membrane stage 470 and third membrane stage 480 respectively to obtain mixed feed-gas stream 404. Mixed feed-gas stream 404 is introduced to first membrane stage 460 where it is separated in the presence of a carbon dioxide-selective membrane to obtain first retentate stream 461 and first permeate stream 462.

First retentate stream 461 is then introduced to second membrane stage 470 where it is separated using a carbon dioxide-selective membrane to obtain second membrane-stage retentate stream 471 and second membrane-stage permeate stream 472. Second membrane-stage retentate stream 471 is enriched in hydrogen sulfide and can be sent to a sulfur recovery unit. Second membrane-stage permeate stream 472 is enriched in carbon dioxide; it is compressed and combined with feed-gas stream 401 to be recycled through the system.

First permeate stream 462 is compressed and then fed to third membrane stage 480 where it is separated using a carbon dioxide-selective membrane to obtain third membrane-stage retentate stream 481 and third membrane-stage permeate stream 482. The third membrane-stage permeate stream 482 is enriched in carbon dioxide and can be treated to remove any remaining hydrogen sulfide, or in some instances captured for use in appropriate industrial applications or discharged into the atmosphere. The third membrane-stage retentate stream 481 can be combined with the feed-gas stream 401 to be recycled through the system.

Each of the processes illustrated in FIG. 4 produce streams that are stripped of hydrogen sulfide. Typically, these hydrogen sulfide-stripped streams can contain between about 0.1 and 0.15 mol % (1,000-1,500 ppm) hydrogen sulfide, alternately between about 0.01 and 0.015 mol % (100-150 ppm) hydrogen sulfide. In some locations, such streams can be safely discharged to the atmosphere after catalytic or thermal oxidation to convert remaining hydrogen sulfide to sulfur dioxide. According to at least one embodiment, the hydrogen sulfide-stripped stream can be sent directly to a catalytic converter of the sulfur recovery unit. According to at least one embodiment, the hydrogen sulfide-stripped stream can be used in enhanced oil recovery operations. Streams with a concentration of hydrogen sulfide greater than about 0.1-0.15 mol % can be treated to remove at least some remaining hydrogen sulfide using a polishing step. Such processes can include chemical polishing (such as a reaction of hydrogen sulfide with zinc oxide), molecular sieve adsorption, or a selective amine absorption process. The polished gas can be catalytically or thermally oxidized and discharged, and the stripped hydrogen sulfide can be recycled. In some instances, the stream that is stripped of hydrogen sulfide needs no further polishing after the membrane separation step.

The processes illustrated in FIG. 4 were simulated to illustrate some of their features. The processes were simulated using a feed gas containing 2 mol % hydrogen sulfide and using enough membrane to produce a residue gas containing 20 mol % hydrogen sulfide, 50 mol % hydrogen sulfide, and 90 mol % hydrogen sulfide. The membranes used were assumed to have 500 gpu carbon dioxide permeance and 16.7, 25, 50, or 100 gpu hydrogen sulfide permeance. This results in carbon dioxide-hydrogen sulfide selectivity of 30, 20, 10, or 5. Each of the processes was capable of producing a stream with a concentration of hydrogen sulfide between about 20 and 90 mol %. The lower limit is the minimum concentration of hydrogen sulfide suitable for a feed to a Claus plant. Claus plant efficiency generally increases with greater concentration of hydrogen sulfide. In some instances a concentration greater than about 90 mol % hydrogen sulfide can be achieved. According to at least one embodiment, the concentration of hydrogen sulfide in a hydrogen sulfide-enriched stream from a membrane separation unit can be between about 90 and 99.5 mol %, alternately between about 95 and 99.5 mol %, alternately between about 97 and 99.5 mol %. Significant capital and operating cost savings can be achieved using a feed gas to a Claus plant that contains greater than 90 mol % hydrogen sulfide.

To illustrate the process of FIG. 4a, a feed-gas containing 2 mol % hydrogen sulfide and 98 mol % carbon dioxide was fed to a process having the configuration shown in FIG. 4a at a rate of 1,000 m$^3$/h and 15 bar pressure. The single-pass permeate stream 412 was fixed at 1 bar pressure. The results show that the residual concentration of hydrogen sulfide in single-pass retentate stream 411 decreases as membrane selectivity increases from 5-30. But even at 30 selectivity and with only 20 mol % hydrogen sulfide in the feed-gas stream 401, the single-pass retentate stream 411 still has a concentration of hydrogen sulfide (0.2 mol %) that is not suitable for venting to the atmosphere after catalytic or thermal oxidation. In these instances, the single-pass retentate stream 411 must be treated to reduce the concentration of hydrogen sulfide to an acceptable level, or it must be recycled to a convenient stage in the gas treatment plant.

The single-pass membrane configuration shown in FIG. 4a is the simplest, least costly configuration, but may not be suitable for producing a hydrogen sulfide-stripped stream that can be safely discharged or used in other applications without undergoing any additional hydrogen sulfide separation unless more selective membranes are used. For a feed gas having 2 mol % hydrogen sulfide, a suitable configuration would be capable of producing a permeate stream with a molar concentration of hydrogen sulfide reduced by at least a factor of 5, preferably at least a factor of 10. With membrane selectivity of 5 and 10, the molar concentration of hydrogen sulfide is only reduced by a factor of about 1.2-4 (Table 5).

TABLE 5

Single-pass membrane configuration performance:
H$_2$S recovery using a feed-gas stream containing 2 mol % H$_2$S

| Selectivity | H$_2$S in single-pass permeate stream 412 (mol %) | Recovered H$_2$S (%)[a] | Membrane area (m$^2$) |
|---|---|---|---|
| Twenty mole percent H$_2$S in single-pass retentate stream ||||
| 5  | 1.03 | 51 | 52 |
| 10 | 0.56 | 74 | 51 |
| 20 | 0.29 | 87 | 51 |
| 30 | 0.2  | 91 | 51 |
| Fifty mole percent H$_2$S in single-pass retentate stream ||||
| 5  | 1.32 | 35 | 55 |
| 10 | 0.77 | 62 | 55 |
| 20 | 0.41 | 80 | 55 |
| 30 | 0.28 | 86 | 55 |
| Ninety mole percent H$_2$S in single-pass retentate stream ||||
| 5  | 1.64 | 18 | 56 |
| 10 | 1.09 | 46 | 58 |
| 20 | 0.63 | 69 | 58 |
| 30 | 0.45 | 78 | 58 |

[a]Percent H$_2$S from the feed-gas stream that is recovered in the single-pass retentate stream.

To illustrate the process of FIG. 4b, a feed-gas containing 2 mol % hydrogen sulfide and 98 mol % carbon dioxide was fed to a process having the configuration shown in FIG. 4b (Table 6). In this configuration, the first retentate-in-series permeate stream 422 contains about 0.1-0.3 mol % hydrogen sulfide. The first retentate-in-series retentate stream 421 has about 5 mol % hydrogen sulfide and is processed in second retentate-in-series membrane stage 430 to obtain 20-90 mol % hydrogen sulfide in second retentate-in-series retentate stream 431, which includes 85-95% of hydrogen sulfide from feed-gas stream 401 (Table 6). The second retentate-in-series permeate stream 432 contains about 2 mol % hydrogen sulfide, which is similar to the concentration of hydrogen sulfide in the feed-gas stream 401; an efficient use of this stream is to combine it with feed-gas stream 401 to be recycled through the process. This configuration is suitable for producing a hydrogen sulfide-stripped stream that can be safely discharged or used in other applications without additional hydrogen sulfide separation when membranes having carbon dioxide-hydrogen sulfide selectivity of 20 or more are used; membranes with less selectivity may be unsuitable for this purpose.

TABLE 6

Two-stage retentate-in-series configuration performance: H$_2$S recovery using a feed-gas stream containing 2 mol % H$_2$S

| Selectivity | H$_2$S in first retentate-in-series permeate stream 422 (mol %) | Recovered H$_2$S (%)[a] | Membrane area (m$^2$) MS 420 | Membrane area (m$^2$) MS 430 | Theoretical compressor power (kW) |
|---|---|---|---|---|---|
| Twenty mole percent H$_2$S in second retentate-in-series retentate stream ||||||
| 5  | 0.65 | 70 | 51 | 20 | 38 |
| 10 | 0.31 | 86 | 50 | 19 | 35 |
| 20 | 0.15 | 93 | 49 | 18 | 34 |
| 30 | 0.10 | 96 | 49 | 18 | 33 |
| Fifty mole percent H$_2$S in second retentate-in-series retentate stream ||||||
| 5  | 0.71 | 65 | 53 | 33 | 59 |
| 10 | 0.32 | 85 | 53 | 27 | 48 |
| 20 | 0.15 | 93 | 52 | 25 | 43 |
| 30 | 0.10 | 95 | 52 | 24 | 41 |
| Ninety mole percent H$_2$S in second retentate-in-series retentate stream ||||||
| 5  | 0.82 | 59 | 54 | 61 | 109 |
| 10 | 0.35 | 83 | 54 | 40 | 68 |
| 20 | 0.16 | 92 | 54 | 33 | 53 |
| 30 | 0.10 | 95 | 53 | 31 | 49 |

MS, membrane stage
[a]Percent H$_2$S from the feed-gas stream that is recovered in the second retentate-in-series retentate stream.

To illustrate the process of FIG. 4c, a feed-gas containing 2 mol % hydrogen sulfide and 98 mol % carbon dioxide was fed to a process having the configuration shown in FIG. 4c. In this configuration, the process was simulated to achieve 20, 50, and 90 mol % hydrogen sulfide concentration in first permeate-in-series retentate stream 441 (Table 7). After processing in first permeate-in-series membrane stage 440, the stream 442 was compressed to increase pressure from 1 bar to 15 bar and then sent to second permeate-in-series membrane stage 450. The second permeate-in-series retentate stream 451, which contained about 2 mol % hydrogen sulfide, was combined with the feed-gas stream 401 to be recycled through the process. About 95-99% of the hydrogen sulfide in feed-gas stream 401 was concentrated in first permeate-in-series retentate stream 441, and only a few percent ends up in second permeate-in-series permeate stream 452 (Table 7).

Using membranes in this configuration with carbon dioxide-hydrogen sulfide selectivity of at least 10 produces a second permeate-in-series permeate stream 452 that has a sufficiently low concentration of hydrogen sulfide to allow safe discharge without further treatment (other than catalytic or thermal oxidation). For example, the second permeate-in-series permeate stream 452 has only 200-600 ppm hydrogen sulfide if membranes with carbon dioxide-hydrogen sulfide selectivity of at least 20 are used in this configuration. But the improvement comes at the cost of a significant increase in membrane area and compressor power as compared with simpler configurations.

TABLE 7

Two-stage permeate-in-series configuration performance: $H_2S$ recovery using a feed-gas stream containing 2 mol % $H_2S$

| Selectivity | $H_2S$ in second permeate-in-series permeate stream 452 (mol %) | Recovered $H_2S$ (%)[a] | Membrane area (m$^2$) MS 440 | Membrane area (m$^2$) MS 450 | Theoretical compressor power (kW) |
|---|---|---|---|---|---|
| Twenty mole percent $H_2S$ in first permeate-in-series retentate stream | | | | | |
| 5 | 0.30 | 86 | 89 | 49 | 177 |
| 10 | 0.10 | 95 | 66 | 48 | 146 |
| 20 | 0.035 | 98 | 58 | 48 | 128 |
| 30 | 0.018 | 99 | 55 | 48 | 122 |
| Fifty mole percent $H_2S$ in first permeate-in-series retentate stream | | | | | |
| 5 | 0.34 | 83 | 131 | 52 | 259 |
| 10 | 0.13 | 94 | 83 | 52 | 179 |
| 20 | 0.044 | 98 | 68 | 51 | 145 |
| 30 | 0.022 | 99 | 63 | 51 | 136 |
| Ninety mole percent $H_2S$ in first permeate-in-series retentate stream | | | | | |
| 5 | 0.39 | 81 | 251 | 53 | 527 |
| 10 | 0.16 | 92 | 99 | 53 | 242 |
| 20 | 0.057 | 97 | 83 | 52 | 170 |
| 30 | 0.031 | 98 | 74 | 52 | 152 |

[a]Percent $H_2S$ from the feed-gas stream that is recovered in the second retentate-in-series retentate stream.

To illustrate the process of FIG. 4d, a feed-gas containing 2 mol % hydrogen sulfide and 98 mol % carbon dioxide was fed to a process having the configuration shown in FIG. 4d. The process in this configuration was simulated to achieve 20, 50, and 90 mol % hydrogen sulfide concentration in second membrane-stage retentate stream 471 (Table 8). In the simulations, the first retentate stream 461 had 10 mol % hydrogen sulfide. The two recycle streams, second membrane-stage permeate stream 472 and third membrane-stage retentate stream 481, each had 2 mol % hydrogen sulfide. The first retentate stream 461 contained 10 mol % hydrogen sulfide. When membranes having carbon dioxide-hydrogen sulfide selectivity of at least 10 are used, the process achieves suitable hydrogen sulfide concentration in the third membrane-stage permeate stream 482 to safely discharge the stream with no further treatment (other than catalytic or thermal oxidation). This configuration was capable of concentrating hydrogen sulfide in the second membrane-stage retentate stream 471 to about 90 mol % while recovering about 95-99% of the hydrogen sulfide from the feed-gas stream 401 (Table 8). In this process, the molar concentration of hydrogen sulfide in the feed-gas stream 401 is reduced by a factor of 20-30 compared with the concentration of hydrogen sulfide in the third membrane-stage permeate stream 482.

TABLE 8

Three-stage configuration performance: $H_2S$ recovery using a feed-gas stream containing 2 mol % $H_2S$

| Selectivity | $H_2S$ in third MS permeate stream 482 (mol %) | Recovered $H_2S$ (%)[a] | Membrane area (m$^2$) MS 460 | Membrane area (m$^2$) MS 470 | Membrane area (m$^2$) MS 480 | Theoretical compressor power (kW) Unit 465 | Theoretical compressor power (kW) Unit 475 |
|---|---|---|---|---|---|---|---|
| Twenty mole percent $H_2S$ in second MS retentate stream | | | | | | | |
| 5 | 0.27 | 88 | 76 | 49 | 8 | 166 | 15 |
| 10 | 0.089 | 96 | 61 | 82 | 7 | 135 | 14 |
| 20 | 0.028 | 99 | 55 | 48 | 7 | 123 | 13 |
| 30 | 0.014 | 99 | 53 | 93 | 7 | 119 | 13 |
| Fifty mole percent $H_2S$ in second MS retentate stream | | | | | | | |
| 5 | 0.29 | 86 | 88 | 52 | 18 | 191 | 31 |
| 10 | 0.091 | 96 | 65 | 81 | 14 | 145 | 24 |
| 20 | 0.028 | 99 | 59 | 51 | 12 | 130 | 21 |
| 30 | 0.014 | 99 | 57 | 94 | 12 | 126 | 21 |
| Ninety mole percent $H_2S$ in second MS retentate stream | | | | | | | |
| 5 | 0.32 | 84 | 108 | 53 | 39 | 235 | 64 |
| 10 | 0.099 | 95 | 69 | 78 | 24 | 152 | 36 |
| 20 | 0.030 | 99 | 60 | 90 | 19 | 133 | 28 |
| 30 | 0.015 | 99 | 58 | 93 | 18 | 128 | 25 |

MS, membrane stage
[a]Percent $H_2S$ from the feed-gas stream that is recovered in the second retentate-in-series retentate stream.

The processes summarized in Tables 5-8 were carried out using a feed gas containing 2 mol % hydrogen sulfide. To illustrate the effectiveness of the processes with a feed having a greater concentration of hydrogen sulfide, additional simulations were carried out using a feed gas having about 10 mol % hydrogen sulfide.

The process of FIG. 4a was carried out using a feed gas with 10 mol % hydrogen sulfide and 90 mol % carbon dioxide (Table 9). In this configuration, even the most selective membrane for carbon dioxide-hydrogen sulfide separation (20) used with the lowest concentration of hydrogen sulfide (20 mol %) was not able to sufficiently reduce the concentration of hydrogen sulfide in the single-pass permeate stream 412 to allow safe discharge into the atmosphere without further treatment (other than by catalytic or thermal oxidation) (Table 9). However, this configuration can still be used with an additional polishing step.

TABLE 9

Single-pass membrane configuration performance: $H_2S$ recovery using a feed-gas stream containing 10 mol % $H_2S$

| Selectivity | $H_2S$ in single-pass permeate stream 412 (mol %) | Recovered $H_2S$ (%)[a] | Membrane area (m$^2$) |
|---|---|---|---|
| Twenty mole percent $H_2S$ in single-pass retentate stream | | | |
| 5 | 3.3 | 80 | 36 |
| 10 | 1.7 | 91 | 33 |
| 20 | 0.9 | 95 | 32 |
| 30 | 0.6 | 97 | 32 |
| Fifty mole percent $H_2S$ in single-pass retentate stream | | | |
| 5 | 5.1 | 55 | 57 |
| 10 | 2.8 | 76 | 56 |
| 20 | 1.4 | 88 | 56 |
| 30 | 1.0 | 92 | 55 |

TABLE 9-continued

Single-pass membrane configuration performance:
$H_2S$ recovery using a feed-gas stream containing 10 mol % $H_2S$

| Selectivity | $H_2S$ in single-pass permeate stream 412 (mol %) | Recovered $H_2S$ (%)[a] | Membrane area (m$^2$) |
|---|---|---|---|
| Ninety mole percent $H_2S$ in single-pass retentate stream ||||
| 5 | 7.4 | 29 | 66 |
| 10 | 4.7 | 56 | 70 |
| 20 | 2.7 | 76 | 73 |
| 30 | 1.9 | 83 | 74 |

[a]Percent $H_2S$ from the feed-gas stream that is recovered in the single-pass retentate stream.

The process of FIG. 4b was carried out using a feed gas having 10 mol % hydrogen sulfide and 90 mol % carbon dioxide (Table 10). The first retentate-in-series membrane stage 420 produces a retentate stream, first retentate-in-series retentate stream 421, which has 20 mol % hydrogen sulfide. Between about 92-98% of the hydrogen sulfide from the feed gas is recovered and concentrated in second retentate-in-series retentate stream 431 after processing in the second retentate-in-series membrane stage 430 (Table 10). This stream is sent to a sulfur recovery unit to be processed for sulfur recovery. Between about 0.2-0.9 mol % hydrogen sulfide remains in the second retentate-in-series permeate stream 432 making it unsuitable for discharging into the atmosphere without further treatment.

TABLE 10

Two-stage retentate-in-series configuration performance: $H_2S$ recovery using a feed-gas stream containing 10 mol % $H_2S$

| Selectivity | $H_2S$ in first retentate-in-series permeate stream 422 (mol %) | Recovered $H_2S$ (%)[a] | Membrane area (m$^2$) MS 420 | Membrane area (m$^2$) MS 430 | Theoretical compressor power (kW) |
|---|---|---|---|---|---|
| Fifty mole percent $H_2S$ in second retentate-in-series retentate stream ||||||
| 5 | 3.21 | 73 | 51 | 28 | 45 |
| 10 | 0.91 | 93 | 47 | 68 | 119 |
| 20 | 0.44 | 96 | 46 | 61 | 105 |
| 30 | 0.29 | 98 | 46 | 59 | 101 |
| Ninety mole percent $H_2S$ in second retentate-in-series retentate stream ||||||
| 5 | 3.67 | 66 | 56 | 70 | 100 |
| 10 | 0.94 | 92 | 52 | 114 | 175 |
| 20 | 0.44 | 96 | 51 | 93 | 134 |
| 30 | 0.29 | 97 | 51 | 87 | 123 |

MS, membrane stage
[a]Percent $H_2S$ from the feed-gas stream that is recovered in the second retentate-in-series retentate stream.

The process of FIG. 4c was simulated using a feed gas having 10 mol % hydrogen sulfide and 90 mol % carbon dioxide (Table 11). The second permeate-in-series membrane stage 450 produced a second permeate-in-series retentate stream 451 having 10 mol % hydrogen sulfide. In this configuration, the process is capable of producing a hydrogen sulfide-enriched stream, first permeate-in-series retentate stream 441, with a concentration of hydrogen sulfide that is sufficiently high to be processed in the Claus plant of a sulfur recovery unit. The process is also capable of producing a hydrogen sulfide-stripped stream, second permeate-in-series permeate stream 452, that has a sufficiently low concentration of hydrogen sulfide to be safely discharged to the atmosphere without further treatment (other than by catalytic or thermal oxidation).

TABLE 11

Two-stage permeate-in-series configuration performance: $H_2S$ recovery using a feed-gas stream containing 10 mol % $H_2S$

| Selectivity | $H_2S$ in second permeate-in-series permeate stream 452 (mol %) | Recovered $H_2S$ (%)[a] | Membrane area (m$^2$) MS 440 | Membrane area (m$^2$) MS 450 | Theoretical compressor power (kW) |
|---|---|---|---|---|---|
| Twenty mole percent $H_2S$ in first permeate-in-series retentate stream ||||||
| 5 | 1.18 | 94 | 42 | 29 | 85 |
| 10 | 0.39 | 98 | 36 | 28 | 74 |
| 20 | 0.13 | 99 | 34 | 27 | 68 |
| 30 | 0.063 | 99.7 | 33 | 27 | 67 |
| Fifty mole percent $H_2S$ in first permeate-in-series retentate stream ||||||
| 5 | 1.55 | 87 | 90 | 46 | 168 |
| 10 | 0.54 | 96 | 70 | 45 | 131 |
| 20 | 0.18 | 99 | 62 | 44 | 114 |
| 30 | 0.093 | 99.2 | 60 | 44 | 109 |
| Ninety mole percent $H_2S$ in first permeate-in-series retentate stream ||||||
| 5 | 1.94 | 82 | 191 | 52 | 331 |
| 10 | 0.75 | 93 | 117 | 51 | 190 |
| 20 | 0.27 | 97 | 94 | 50 | 145 |
| 30 | 0.143 | 98.7 | 88 | 49 | 133 |

[a]Percent $H_2S$ from the feed-gas stream that is recovered in the second retentate-in-series retentate stream.

The process of FIG. 4d was also simulated using a feed gas having 10 mol % hydrogen sulfide and 90 mol % carbon dioxide (Table 12). In this simulation, the first retentate stream 461 contained 20 mol % hydrogen sulfide. The two recycle streams, second membrane-stage permeate stream 472 and third membrane-stage retentate stream 481, each contained 10 mol % hydrogen sulfide. The process was capable of producing a hydrogen sulfide-enriched stream, second membrane-stage retentate stream 471, suitable for sending to the Claus plant of a sulfur recovery unit. The process was also capable of producing a hydrogen sulfide-stripped stream, third membrane-stage permeate stream 482 suitable for safely discharging to the atmosphere without additional treatment (other than catalytic or thermal oxidation). In some instances, the process was also capable of recovering as much as 99-99.5% of hydrogen sulfide from the feed gas and concentrating it in second membrane-stage retentate stream 471. However, this configuration required the most membrane area and compressor power of the configurations shown in FIG. 4.

TABLE 12

Three-stage configuration performance: $H_2S$ recovery using a feed-gas stream containing 10 mol % $H_2S$

| Selectivity | $H_2S$ in third MS permeate stream 482 (mol %) | Recovered $H_2S$ (%)[a] | Membrane area (m$^2$) MS 460 | Membrane area (m$^2$) MS 470 | Membrane area (m$^2$) MS 480 | Theoretical compressor power (kW) Unit 465 | Theoretical compressor power (kW) Unit 475 |
|---|---|---|---|---|---|---|---|
| Fifty mole percent $H_2S$ in second MS retentate stream ||||||||
| 5 | 1.16 | 90 | 64 | 34 | 45 | 129 | 56 |
| 10 | 0.367 | 97 | 55 | 29 | 44 | 112 | 45 |
| 20 | 0.114 | 99 | 52 | 26 | 43 | 105 | 40 |
| 30 | 0.057 | 99.5 | 51 | 25 | 43 | 103 | 39 |

TABLE 12-continued

Three-stage configuration performance: $H_2S$ recovery using a feed-gas stream containing 10 mol % $H_2S$

| Selectivity | $H_2S$ in third MS permeate stream 482 (mol %) | Recovered $H_2S$ (%)[a] | Membrane area (m$^2$) MS 460 | MS 470 | MS 480 | Theoretical compressor power (kW) Unit 465 | Unit 475 |
|---|---|---|---|---|---|---|---|
| Ninety mole percent $H_2S$ in second MS retentate stream | | | | | | | |
| 5 | 1.26 | 88 | 75 | 95 | 50 | 151 | 134 |
| 10 | 0.384 | 97 | 62 | 64 | 49 | 125 | 78 |
| 20 | 0.115 | 99 | 58 | 53 | 48 | 116 | 60 |
| 30 | 0.057 | 99.5 | 56 | 51 | 48 | 114 | 55 |

MS, membrane stage
[a]Percent $H_2S$ from the feed-gas stream that is recovered in the second retentate-in-series retentate stream.

Sulfur recovery can be carried out using a variety of techniques and processes. An example of a common process for recovering sulfur is the Claus process. Another example of a sulfur recovery process is generally referred to as liquid phase oxidation, which involves converting hydrogen sulfide to sulfur in the liquid phase in the presence of an oxidant. Liquid phase oxidation is typically carried out in the presence of a catalyst.

An embodiment of a process for enriching hydrogen sulfide in a sour gas for feed to a sulfur recovery unit can include the steps of: providing a sour gas having carbon dioxide and hydrogen sulfide, separating the sour gas in a membrane separation unit to obtain hydrogen sulfide-enriched gas and hydrogen sulfide-stripped gas, and processing the hydrogen sulfide-enriched gas in a sulfur recovery unit. By reducing the overall flow of gas to the sulfur recovery unit, relatively smaller equipment can be used in the sulfur recovery process and in subsequent tail gas treatment processes.

The process of enriching hydrogen sulfide for feed to a sulfur recovery unit can also include using nonselective amine absorption, selective amine absorption, or both to further enrich the hydrogen sulfide-enriched stream or to reduce the concentration of hydrogen sulfide in the hydrogen sulfide-stripped stream. According to at least one embodiment, the process can include separating the sour gas using nonselective amine absorption to obtain an overhead gas and a recovered sour gas and sending the recovered sour gas to the membrane separation unit. According to at least one embodiment, the process can include separating the sour gas using selective amine absorption, and sending the recovered sour gas to the membrane separation unit. According to at least one embodiment, the process can include processing the sour gas in the membrane separation unit and sending the hydrogen sulfide-stripped stream to a selective amine absorption unit to obtain overhead gas and recovered hydrogen sulfide. The recovered hydrogen sulfide can be recycled to the membrane separation unit, and the overhead gas can be polished to remove remaining hydrogen sulfide, oxidized and vented to the atmosphere, or simply vented to the atmosphere.

The step of processing the hydrogen sulfide-rich gas in a sulfur recovery unit includes introducing the hydrogen sulfide-rich gas to a process unit for the purpose of recovering sulfur from sulfur compounds in the hydrogen sulfide-rich gas. In certain embodiments, the sulfur recovery unit can include a Claus unit. The high concentration of hydrogen sulfide in the hydrogen sulfide-rich gas allows the sulfur recovery unit to operate more efficiently. In some embodiments, heat energy from the oxidation of hydrogen sulfide in the hydrogen sulfide-rich gas is sufficient to destroy other minor components in the hydrogen sulfide-rich gas, such as mercaptans, benzene, toluene, and xylene. The destruction of benzene, toluene, and xylene in the sulfur recovery unit can improve sulfur recovery in the sulfur recovery unit and reduce foaming and other associated problems in subsequent tail gas treatment processes (e.g., amine absorption). And because high concentrations of hydrogen sulfide can be achieved in hydrogen sulfide-rich gas by membrane separation alone, conventional amine absorption processes for enriching hydrogen sulfide fed to a sulfur recovery unit can be avoided; significantly simplifying operations and reducing capital expenses.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

Unless otherwise indicated, all numbers expressing quantities, percentages or proportions, and other numerical values used in the specification and claims should be understood as being modified by the term "about." The term "about" applies to all numeric values, whether or not explicitly indicated. "About" generally refers to a range of numbers that a person of ordinary skill in the art would consider a reasonable amount of deviation to the recited values.

Ranges can be expressed in this disclosure as from about one particular value and to about another particular value. With these ranges, another embodiment is from the one particular value and/or to the other particular value, along with all combinations within the range. When the range of values is described or referenced in this disclosure, the interval encompasses each intervening value between the upper limit and the lower limit as well as the upper limit and the lower limit and includes smaller ranges of the interval subject to any specific exclusion provided.

We claim:
1. A process for recovering sulfur from a sour gas, the process comprising the steps of:
   providing the sour gas to a membrane separation unit having a membrane stage that comprises a carbon dioxide-selective membrane, the carbon dioxide-selective membrane comprising a perfluoropolymer and having a carbon dioxide-hydrogen sulfide selectivity greater than 10, and wherein the sour gas comprises carbon dioxide and at least 1 mol % hydrogen sulfide;
   separating the sour gas using the carbon dioxide-selective membrane in the membrane separation stage to obtain hydrogen sulfide-enriched gas and hydrogen sulfide-stripped gas, wherein the hydrogen sulfide-enriched gas has a hydrogen sulfide concentration of at least 20 mol %, and wherein the hydrogen sulfide-stripped gas comprises carbon dioxide; and
   processing the hydrogen sulfide-enriched gas in a sulfur recovery unit to obtain sulfur.
2. The process of claim 1, wherein the hydrogen sulfide-stripped gas further comprises residual hydrogen sulfide, and wherein the process further comprises the steps of:
   oxidizing the hydrogen sulfide-stripped gas in an oxidizer such that residual hydrogen sulfide in the hydrogen sulfide-stripped gas is reacted with oxygen to produce sulfur dioxide-bearing gas.

3. The process of claim 2, further comprising the step of: venting the sulfur dioxide-bearing gas to the atmosphere.

4. The process of claim 2, further comprising the step of: capturing the sulfur dioxide-bearing gas for use in enhanced oil recovery operations.

5. The process of claim 1, wherein the hydrogen sulfide-stripped gas has a concentration of hydrogen sulfide that is less than 0.1 mol %.

6. The process of claim 1, wherein the hydrogen sulfide-stripped gas has a concentration of hydrogen sulfide that is less than 0.015 mol %.

7. The process of claim 1, wherein the hydrogen sulfide-stripped gas has a concentration of hydrogen sulfide that is less than 0.01 mol %.

8. The process of claim 1, wherein the hydrogen sulfide-enriched gas has a concentration of hydrogen sulfide that is greater than 80 mol %.

9. The process of claim 1, wherein the hydrogen sulfide-enriched gas has a concentration of hydrogen sulfide that is greater than 90 mol %.

10. The process of claim 1, wherein the hydrogen sulfide-enriched gas has a concentration of hydrogen sulfide that is greater than 95 mol %.

11. The process of claim 1, wherein the carbon dioxide-selective membrane has carbon dioxide-hydrogen sulfide selectivity greater than 20.

12. The process of claim 1, wherein the carbon dioxide-selective membrane has carbon dioxide-hydrogen sulfide selectivity greater than 30.

13. The process of claim 1, wherein the membrane separation unit has a single-pass membrane stage configuration.

14. The process of claim 1, wherein the membrane separation unit has a two-stage retentate-in-series membrane configuration.

15. The process of claim 1, wherein the membrane separation unit has a two-stage permeate-in-series membrane configuration.

16. The process of claim 1, wherein the membrane separation unit has a three-stage membrane configuration.

17. The process of claim 1, wherein the perfluoropolymer comprises a monomer having the chemical structure:

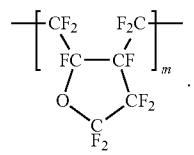

18. The process of claim 1, wherein the perfluoropolymer comprises a monomer having the chemical structure:

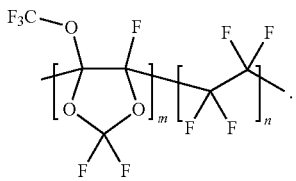

19. The process of claim 1, wherein the perfluoropolymer comprises a monomer having a chemical structure selected from the group consisting of

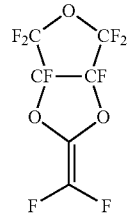

A

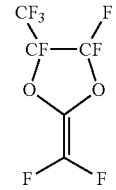

B

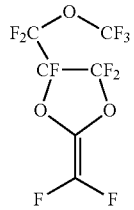

C

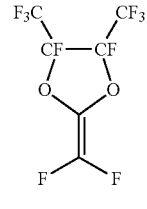

D

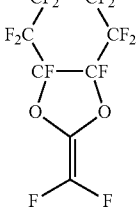

E

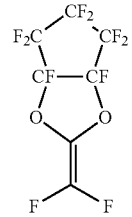

F

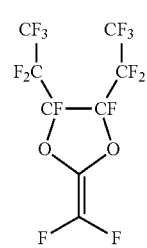

G

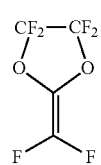
and combinations of the same.
* * * * *